United States Patent [19]

Manning et al.

[11] 3,997,638

[45] Dec. 14, 1976

[54] PRODUCTION OF METAL ION CONTAINING CARBON FIBERS USEFUL IN ELECTRON SHIELDING APPLICATIONS

[75] Inventors: Andrew J. Manning, Randolph Township; Lowell G. Saferstein, Piscataway; Michael J. Ram, West Orange, all of N.J.

[73] Assignee: Celanese Corporation, New York, N.Y.

[22] Filed: Sept. 18, 1974

[21] Appl. No.: 507,114

[52] U.S. Cl. .............................. 264/29.7; 264/182; 264/DIG. 19; 423/447.4

[51] Int. Cl.[2] .................... C01B 31/30; C04B 25/46

[58] Field of Search ............... 264/29, 63, DIG. 19, 264/182; 423/447

[56] References Cited

UNITED STATES PATENTS

| | | | |
|---|---|---|---|
| 3,053,775 | 9/1962 | Abbott | 264/DIG. 19 |
| 3,311,481 | 3/1967 | Sterry et al. | 264/DIG. 19 |
| 3,385,915 | 5/1968 | Hamling | 264/DIG. 19 |
| 3,399,979 | 9/1968 | Hamling | 264/DIG. 19 |
| 3,403,008 | 9/1968 | Hamling | 264/DIG. 19 |
| 3,406,025 | 10/1968 | Hamling | 264/DIG. 19 |
| 3,442,997 | 5/1969 | Parratt | 264/DIG. 19 |
| 3,529,044 | 9/1970 | Santangelo | 264/DIG. 19 |
| 3,652,749 | 3/1972 | Sobel et al. | 264/DIG. 19 |
| 3,720,759 | 3/1973 | Overhoff | 264/DIG. 19 |
| 3,760,049 | 9/1973 | Borer et al. | 264/DIG. 19 |
| 3,846,527 | 11/1974 | Winter et al. | 264/63 |

*Primary Examiner*—Jay H. Woo

[57] ABSTRACT

An improved process is provided for the formation of metal ion containing carbon fibers which particularly are suited for utilization in electron shielding applications. An acrylic fibrous material is formed having substantially uniformly dispersed therein a halide of a transition metal. The metal halide (e.g. a chloride) present within the fibrous material is (1) converted to an oxide, (2) the fibrous material containing the metal oxide is heated in an oxygen-containing atmosphere until thermally stabilized, and (3) the thermally stabilized fibrous material is carbonized or carbonized and graphitized at a more highly elevated temperature in an appropriate atmosphere. The resulting product comprises ions of a transition metal substantially uniformly dispersed in an amorphous carbon or graphitic carbon matrix. The halide of a transition metal may be incorporated into the acrylic precursor by co-spinning and/or padding prior to thermal stabilization. The conversion of the halide of a transition metal to an oxide prior to thermal stabilization may be conducted by contact with a base or with an oxidizing agent as described.

24 Claims, 2 Drawing Figures

PRODUCTION OF METAL ION CONTAINING CARBON FIBERS USEFUL IN ELECTRON SHIELDING APPLICATIONS

BACKGROUND OF THE INVENTION

In recent years inorganic fibers and processes for the production of the same have received increasing attention. Such interest may be traced at least in part to the demands of industry for fibers capable of withstanding various environments without deleterious effects.

It is an object of the present invention to provide an improved process for the production of metal ion containing carbon fibers.

It is an object of the present invention to provide an improved process for the production of metal ion containing carbon fibers which offers ease of fiber formation and does not require the use of strong acids as spinning solvents.

It is a further object of the present invention to provide a process for the formation of metal ion containing carbon fibers which are capable of withstanding highly elevated temperatures and which may be incorporated in a matrix material to form monolithic composite articles of simple or complex configurations suitable for service in severe environments without deleterious effects.

It is another object of the present invention to provide a process for the efficient formation of carbon fibers containing a uniform dispersion of metal ions which may be utilized in electron absorbing applications, e.g. as shielding of X-ray machines, etc.

These and cther objects, as well as the scope, nature, and utilization of the invention will be apparent to those skilled in the art from the following detailed description and appended claims.

SUMMARY OF THE INVENTION

It has been found that an improved process for the production of a metal ion containing carbonaceous fibrous material capable of utilization in electron absorbing applications comprises:

a. forming an acrylic fibrous material selected from the group consisting essentially of an acrylonitrile homopolymer and acrylonitrile copolymers containing at least about 85 mole percent acrylonitrile units and up to about 15 mole percent of one or more monovinyl units copolymerized therewith having substantially uniformly dispersed therein a halide of a transition metal selected from the group consisting essentially of cobalt, hafnium, iron, molybdenum, nickel, niobium, tantalum, titanium, tungsten, uranium, vanadium, zirconium, and mixtures of the foregoing, b. converting said halide of said transition metal substantially uniformly dispersed within said fibrous material to an oxide of said transition metal, c. heating said acrylic fibrous material having said oxide of said transition metal incorporated therein in an oxygen-containing atmosphere at a temperature of about 220° to 300° C. until said fibrous material is thermally stabilized and rendered non-burning when subjected to an ordinary match flame, and d. heating said resulting stabilized fibrous material having said oxide of said transition metal incorporated therein in an atmosphere selected from the group consisting essentially of nitrogen, argon, and helium provided at a temperature of about 1,100° to 3,000° C. for at least 15 seconds.

DESCRIPTION OF PREFERRED EMBODIMENTS

Figure 1:
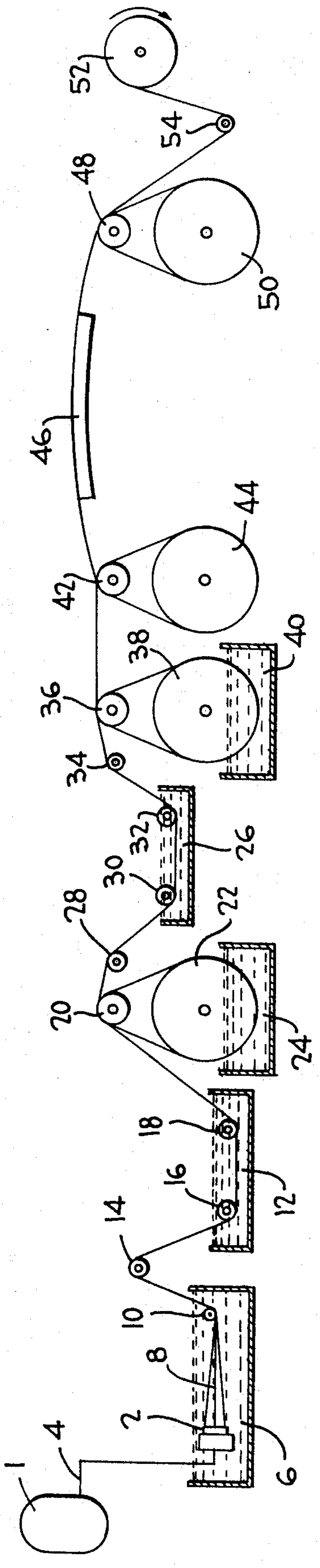
FIG. 1 and FIG. 2 illustrate representative apparatus arrangements for carrying out preferred embodiments of the initial steps of the process.

Initially an acrylic fibrous material is formed which has substantially uniformly dispersed therein a halide of a transition metal selected from the group consisting essentially of cobalt, hafnium, iron, molybdenum, nickel, niobium, tantalum, titanium, tungsten, uranium, vanadium, zirconium, and mixtures of the foregoing.

The acrylic polymer which is utilized in the present process is formed either (1) entirely of recurring acrylonitrile units, or (2) of recurring acrylonitrile units copolymerized with a minor proportion of one or more monovinyl units to produce a copolymer exhibiting properties substantially similar to an acrylonitrile homopolymer. Acrylonitrile homopolymers are particularly preferred for use in the present process. Suitable copolymer materials commonly contain at least about 85 mol percent of recurring acrylonitrile units and up to about 15 mol percent of one or more monovinyl units copolymerized therewith. The preferred acrylonitrile copolymers contain at least about 95 mol percent of acrylonitrile units and up to about 5 mol percent of one or more monovinyl units copolymerized therewith. Suitable monovinyl units include styrene, methyl acrylate, methyl methacrylate, vinyl acetate, vinyl chloride, vinylidene chloride, vinyl pyridine and the like, or a plurality of such monomers.

The halide of a transition metal which is incorporated in the acrylic fibrous material preferably is a chloride; however, other halides such as bromides, fluorides or iodides may be utilized. The chlorides tend to be more readily soluble in common solvents without excessive reaction and for this reason can be incorporated in the acrylic fibrous material with the greatest ease. The halides selected may be either simple halides or organohalides of the metals.

Representative cobalt halides for use in the process include cobaltous chloride, cobaltous bromide, etc. The preferred cobalt halide for use in the process is cobaltous chloride.

Representative hafnium halides for use in the process include hafnium tetrachloride, hafnium tetrabromide, etc. The preferred hafnium halide for use in the process is hafnium tetrachloride.

Representative iron halides for use in the process include ferric chloride, ferric bromide, etc. The preferred iron halide for use in the process is ferric chloride.

Representative molybdenum halides for use in the process include molybdenum pentachloride, molybdenum pentabromide, etc. The preferred molybdenum halide for use in the process is molybdenum pentachloride.

Representative nickel halides for use in the process include nickel chloride, nickel bromide, etc. The preferred nickel halide for use in the process is nickel chloride.

Representative niobium halides for use in the process include niobium pentachloride, niobium pentabromide, etc. The preferred niobium halide for use in the process is niobium pentachloride.

Representative tantalum halides for use in the process include tantalum pentachloride, tantalum pentabromide, etc. The preferred tantalum halide for use in the process is tantalum pentachloride.

Representative titanium halides for use in the process are bis(cyclopentadienyl) titanium dichloride which is sometimes identified as titanocene dichloride, titanium tetrachloride, titanium trichloride, etc. The preferred titanium halides for use in the process are bis(cyclopentadienyl) titanium dichloride and titanium trichloride.

Representative tungsten halides for use in the process include tungsten hexachloride, tungsten hexabromide, etc. The preferred tungsten halide for use in the process is tungsten hexachloride.

The preferred uranium halide for use in the process is uranium trichloride.

The preferred vanadium halide for use in the process is vanadium dichloride.

Representative zirconium halides for use in the process include bis(cyclopentadienyl) zirconium dichloride which is sometimes identified as zirconocene dichloride, zirconium tetrachloride, etc. The preferred zirconium halide for use in the process is bis(cyclopentadienyl) zirconium dichloride.

The process of the present invention particularly is suited for the incorporation of ions of titanium, niobium, and tantalum in a carbon fiber.

The halide of the transition metal commonly is provided in the acrylic fibrous material in a concentration of about 1 to 50 percent by weight metal ion based upon the total weight of acrylic polymer and metal halide. In a preferred embodiment of the process the halide of the transition metal is provided in the acrylic fibrous material in a concentration of about 3 to 30 percent by weight metal ion based upon the total weight of acrylic polymer and metal halide.

The halide of the transition metal may be incorporated in the acrylic fibrous material by co-spinning from a common solvent into a coagulation bath and/or by padding from a solution of the halide prior to thermal stabilization.

When the co-spinning embodiment is utilized a halide of the transition metal is selected which is soluble in the spinning solvent in which the acrylic polymer is also dissolved. Representative spinning solvents include N,N-dimethylformamide, N,N-dimethylacetamide, dimethylsulfoxide, gamma-butyrolactone, dimethyl sulfone, 1-methyl pyrrolidone, sulfolane, ethylene carbonate, etc. The particularly preferred spinning solvent is N,N-dimethylacetamide of the chemical formula $CH_3CON(CH_3)_2$ which is sometimes identified as DMAC. The standard technical or commercial grade of N,N-dimethylacetamide may be employed as the solvent in the formation of the spinning solution.

The spinning solution may be prepared by dissolving sufficient acrylic polymer in the solvent to yield a solution suitable for extrusion containing from about 12 to 20 percent acrylic polymer by weight based upon the total weight of the solution, and preferably from about 15 to 17 percent by weight. In a particularly preferred embodiment of the invention the spinning solution contains the acrylic polymer in a concentration of about 16 percent by weight based upon the total weight of the solution. The halide of the transition metal is dissolved in the solvent in a concentration of about 1 to 40 percent by weight based upon the total weight of the spinning solution, and preferably in a concentration of about 2 to 30 percent by weight based upon the total weight of the solution. The concentration of the halide dissolved in the solution will depend at least in part on the degree of its solubility in the specific solvent selected. The low shear viscosity of the spinning solution should be within range of about 50 to 1,000 poise measured at 25° C. and preferably within the range of about 120 to 300 poise measured at 25° C. If the spinning solution low shear viscosity is much below about 120 poise measured at 25° C., spinning breakdowns commonly occur. If the spinning solution low shear viscosity is much above about 300 poise measured at 25° C., extremely high spinning pressures are required and plugging of the extrusion orifice may occur.

The spinning solution is preferably filtered, such as by passage through a plate and frame press or candle filter provided with an appropriate filtration medium, prior to wet spinning in order to assure the removal of any extraneous solid matter which could possibly obstruct the extrusion orifice during the spinning operation.

The spinning solution containing the fiber-forming acrylic polymer and the halide of a transition metal dissolved therein is extruded into a coagulation bath to form an as-spun filamentary material containing the halide substantially uniformly dispersed therein. The coagulation bath selected is a non-solvent for the acrylic polymer, and may also be a non-solvent for the halide. Representative coagulation baths are methanol, ethanol, isopropanol, and toluene. The preferred coagulation bath for use in the process is methanol. The spinning solution may be provided at a temperature of about 20° to 100° C. when extruded and the coagulation bath at a temperature of about 0° to 40° C.

The spinneret utilized during the extrusion may contain a single hole through which a single filament is extruded, and preferably contains a plurality of holes whereby a plurality of filaments may be simultaneously extruded in yarn form. The spinneret preferably contains holes having a diameter between about 40 to 150 microns when producing relatively low denier filaments having an as-spun denier of about 8 to 24 denier per filament. Filaments of larger denier may also be formed. Extrusion pressures between about 10 and 1,000 psig may be conveniently selected, and preferably between about 100 and 300 psig. Spinning or extrusion speeds of about 1 to 10 meters per minute may be utilized, and preferably between about 3 to 5 meters per minute.

In a further embodiment of the present process the halide of a transition metal may be omitted from the spinning solution and introduced into the fibrous material by contact of the resulting as-spun fibrous material with a bath containing a solution of the halide wherein the halide diffuses into the swollen as-spun filamentary material and the fibrous material becomes substantially uniformly impregnated with the halide. Representative solvents for the halides are the simple alcohols, such as methanol, ethanol, and isopropanol. The halides may be provided in the dip bath in a concentration of about 2 to 60 percent by weight based upon the total weight of the dip solution. The dip solution may be provided at a temperature of about 0° to 40° C. and the as-spun fibrous material in contact therewith for about 5 to 30 seconds. Longer residence times may be used without commensurate advantage. Alternatively, the halide of the transition metal may be introduced into the fibrous material from the coagulation bath or a liquid draw bath (e.g. from a glycerin draw bath) or introduced into the acrylic fibrous material in any other manner capable of yielding the desired uniform dispersion of the halide throughout the fiber. When it is desired to maximize the quantity of halide present in the acrylic fibrous material, two or more of the alternate techniques for introducing the halide may sequentially be employed. It is recommended that the loading of the acrylic fibrous material with the halide be completed prior to the complete collapse of the swollen as-spun configuration so as to facilitate the formation of the desired substantially uniform introduction of halide.

The halide of a transition metal substantially uniformly dispersed in the acrylic fibrous material next is converted to the corresponding oxide. The formation of the oxide conveniently may be conducted by contact of the fibrous material with a solution of a base or a solution of an oxidizing agent. The resulting oxide, just as the halide, is substantially uniformly distributed throughout the fibrous material. Aqueous solutions of bases such as ammonium hydroxide, sodium hydroxide, potassium hydroxide, sodium carbonate, sodium bicarbonate, potassium bicarbonate, etc. conveniently may be selected. Aqueous solutions of oxidizing agents such as hydrogen peroxide, sodium hypochlorite, etc. conveniently may be selected. The base or oxidizing agent is provided in the solution in a concentration which is at least capable of stoichiometrically reacting with the halide. The solution conveniently may be provided at a temperature of about 0° to 40° C., and the metal halide containing fibrous material contacted therewith for a residence time of about 1 to 60 minutes (e.g. about 1 to 30 minutes). The contact with the solution of base or oxidizing agent preferably is carried out with the aid of a conventional wash roll apparatus. The contact with the solution of base or oxidizing agent serves to partially collapse the as-spun fiber structure and to transform the metal to a form which will be inert during the thermal stabilization step of the process.

In a further embodiment of the process the halide of the transition metal is provided at least in part in the spinning solution, and the base or oxidizing agent is provided in the coagulation bath. In this manner the conversion of the halide to the oxide proceeds in rapid succession following the extrusion of the fibrous material. For instance, the spinning solution may be extruded directly into an aqueous solution of ammonium hydroxide, etc.

The resulting fibrous material containing the oxide of a transition metal substantially uniformly dispersed therein preferably is washed with water to remove residual spinning solvent, and coagulation bath. The oxide present therein is insoluble in the wash medium. The wash medium may be provided at a temperature of about 10° to 90° C., and the fibrous material in contact therewith for about 1 to 30 minutes.

The water wash treatment conveniently is conducted in an in-line operation with the fibrous material being continuously passed through a water wash medium which is continuously regenerated. Conventional filament wash rolls may be utilized. The filament additionally may be washed with water while wound upon a perforated bobbin, or by the use of other washing means as will be apparent to those skilled in the art.

The fibrous material containing the oxide of a transition metal substantially uniformly dispersed therein preferably is also drawn or stretched from about 1.5 times its original length up to the point at which the filament breaks to orient the same and thereby enhance its properties. The drawing commonly is conducted at an elevated temperature and preferably at a total draw ratio of between about 3:1 and 12:1. As will be apparent to those skilled in the art, the drawing of the fibrous material may be conducted by a variety of techniques. For instance, it is possible for the drawing to be conducted while the fibrous material is (a) immersed in a heated liquid draw medium, (b) suspended in a heated gaseous atmosphere, (e.g. at a temperature of about 120° to 200° C.) or (c) in contact with a heated solid surface (e.g. at a temperature of about 130° to 195° C.). If desired, the total draw imparted to the fibrous material may be conducted by a combination of the foregoing techniques. When draw techniques (b) and (c) are utilized, it is essential that the fibrous material be provided to the draw zone in an essentially dry form in order to avoid void formation. When draw technique (a) is employed, the fibrous material is subsequently washed to remove the draw medium and is dried. Additionally, the liquid medium may also serve a washing and/or coagulating function wherein residual quantities of spinning solvent, coagulation bath, and halide solvent are removed from the water washed fiber.

In a preferred embodiment of the invention the washed fibrous material is at least partially drawn while immersed in a hot glycerin bath. In a particularly preferred embodiment of the invention the fibrous material is drawn while immersed in a hot glycerin bath at a temperature of about 70° to 110° C. and at a draw ratio of about 1.5:1 to 4:1 (preferably at a temperature of about 90° C. and a draw ratio of about 3:1), washed in water (e.g. at a temperature of about 10° to 70° C.), and subsequently drawn at a draw ratio of about 2:1 to 6:1 while in contact with a hot shoe at a temperature of about 100° to 200° C., and preferably at a temperature of about 155° to 175° C.

The acrylic fibrous material having the oxide of a transition metal incorporated therein is heated in a molecular oxygen-containing gaseous atmosphere at a temperature of about 220° to 300° C. until the fibrous material is thermally stabilized and rendered non-burning when subjected to an ordinary match flame. The preferred oxygen-containing gaseous atmosphere is air. During the stabilization reaction the original fibrous configuration remains intact. The thermal stabilization step of the process commonly may be conducted within about 30 minutes to 5 hours depending upon the stabilization temperature utilized, the concentration of molecular oxygen, and the denier per filament of the fibrous material. When the acrylic fibrous material contains copolymerized monovinyl units, it commonly is essential to conduct at least the initial portion of the thermal stabilization reaction at the lower portion of the temperature range. The temperature of the oxygen-containing gaseous atmosphere used during the final portion of the stabilization reaction may exceed 300° C. provided adequate thermal stability was previously imparted to the fibrous material.

The thermal stabilization step may be carried out on either a batch or a continuous basis. The equipment utilized to produce the requisite temperatures to carry out the thermal stabilization reaction may be varied widely as will be apparent to those skilled in the art. For instance, a continuous length of the fibrous material may be passed through a circulating oven, or the tube of a muffle furnace provided with the requisite oxygen-containing atmosphere. The speed of movement of the fibrous material through the stabilization zone will be determined by the size of the heating zone and the desired residence time. Rollers and guides may be provided within the heating zone to direct the movement of the fibrous material.

During the thermal stabilization step a portion of the pendant nitrile groups of the acrylic fibrous material are cyclized, and oxidative cross-linking takes place. The resulting stabilized fibrous material is black in appearance, and has a bound oxygen content of at least 7 (e.g. 7 to 12) percent by weight as determined by the Unterzaucher or other suitable analysis. The oxide of the transition metal continues to be dispersed therein.

The resulting stabilized fibrous material having an oxide of a transition metal incorporated therein is heated in a gaseous atmosphere consisting essentially of nitrogen, argon, or helium provided at a temperature of about 1,100° to 3,000° C. for at least 15 seconds to form the desired product which retains its original fibrous configuration substantially intact. Temperature gradients may be employed. When the fibrous material is subjected to a maximum temperature much below about 2,000° C., then the stabilized acrylic polymer is converted primarily to amorphous carbon. When the fibrous material is subjected to a maximum temperature much above about 2,000° C., then the acrylic polymer is converted primarily to graphitic carbon. Representative residence times within the temperature range of about 1,100° to 3,000° C. commonly range from about 15 seconds to 2 minutes.

The equipment utilized to produce carbonization or carbonization and graphitization may be varied widely as will be apparent to those skilled in the art. It is essential that the apparatus selected be capable of producing the required temperature while excluding oxygen. For instance, suitable apparatus include induction furnaces, tube furnaces in which a hollow graphite susceptor is heated by direct resistance heating, and the like.

The oxide of a transition metal dispersed within the fibrous material is transformed at least in part to a carbide or nitride depending upon the gaseous atmosphere selected. Commonly, the metal ions are dispersed within the fibrous product in a concentration of about 2 to 50 percent by weight based upon the total weight of the fibrous material. The nitride of the metal is formed in a nitrogen atmosphere, while the carbide of the metal is formed in an atmosphere of argon or helium. The higher the temperature the more complete the conversion to the carbide. The metal ion concentration in the fibrous material may be determined by X-ray fluorescence spectrometry or gravimetric analysis. Commonly, the resulting carbon fibers which contain the metal ions have a diameter of about 5 to 10 microns, and exhibit a tensile strength of at least 50,000 psi, e.g. about 50,000 to 300,000 psi.

The metal ion containing fibrous materials formed in the present process particularly are suited for utilization in electron absorbing applications, and are capable of withstanding highly elevated temperatures. For instance, the fibers may be woven into a fibrous assemblage or incorporated in a continuous matrix material (e.g. an epoxy resin) to form a monolithic structure which serves as a shield for X-ray machines. Composite articles of complex and intricate shapes may be formed by conventional filament winding techniques.

The following examples are given as specific illustrations of the invention with reference being made to the drawings. It should be understood, however, that the invention is not limited to the specific details set forth in the examples.

EXAMPLE I

Sixteen parts by weight polyacrylonitrile homopolymer are dissolved in 84 parts by weight, N,N-dimethylacetamide to form a spinning solution. The low shear viscosity (Brookfield) of the resulting solution after filtration and degassing is found to be about 180 poise measured at 25° C.

With reference to FIG. 1 the spinning solution is provided in dope bomb 1 under an atmosphere of nitrogen at 20 psig. The spinning solution is conveyed to spinneret 2 via line 4 where it is extruded into coagulation bath 6. The spinneret 2 is of the standard cup type and comprises a single circle of 80 holes each having a diameter of 100 microns. The spinning solution is conveyed to spinneret 2 at a throughput volume of about 9 cubic centimeters per minute.

The coagulation bath 6 consists of methanol and is provided at a temperature of 20° C. The coagulation bath is caused to flow concurrently with coagulated filaments 8 and is maintained at a relatively constant composition by continuous addition of methanol and withdrawal of a portion of the bath. The coagulation bath 6 has a length of 35 inches and the coagulated filaments are maintained in the same for a residence time of about 12 seconds. The resulting as-spun filaments possess a swollen configuration and contain a substantial quantity of N,N-dimethylacetamide spinning solvent.

The coagulated filaments pass under roller guide 10 which is immersed in coagulation bath 6 and are next conveyed through dip bath 12 which contains tantalum pentachloride ($TaCl_5$) dissolved in methanol. The tantalum pentachloride is present in the bath in a concentration of 17 percent by weight (based on Ta) and is maintained at a substantially constant level by addition of a 22 percent by weight make-up solution. Roller guide 14 is situated intermediate coagulation bath 6 and dip bath 12, and roller guides 16 and 18 direct the movement of the filaments as they pass through dip bath 12. While the filaments are in contact with the dip bath 6, the tantalum pentachloride becomes substantially uniformly dispersed within the swollen filaments. Any remaining N,N-dimethylacetamide tends to leave the filaments, and is replaced by the methanol solution which contains the tantalum pentachloride present therein. The dip bath is maintained at a temperature of 25° C. and the filaments are in contact therewith for a residence time of 10 seconds.

The filaments containing the tantalum pentachloride substantially dispersed therein are conveyed from dip bath 12 to skewed roll 20 and dip roll 22 which is partially immersed in 26% ammonium hydroxide 24 which is maintained at 3° C. The filaments are taken up on a skewed roll 20 at a rate of 5 meters per minute. The filaments are wrapped about skewed roll 20 and dip roll 22 for a residence time of about 300 seconds during which time the filaments are immersed in the ammonium hydroxide for approximately 60 seconds and withdrawn with ammonium hydroxide adhering to the same. While in contact with the ammonium hydroxide tantalum pentachloride present within the filaments is converted to tantalum oxide ($Ta_2O_5$) which is substantially uniformly dispersed within the filaments.

The resulting filaments are next continuously passed through stretch bath 26 having a length of 15 inches which is provided with glycerin at 90° C. Rollers 28 and 34 are situated outside the stretch bath and rollers 30 and 32 immersed within the stretch bath guide the filaments during the stretching operation. The filaments are next taken up on skewed roll 36 and wash roll 38 which is partially immmersed in a water wash bath 40 provided at 40° C. The filaments are taken up on skewed roll 36 at a rate of 15 meters per minute and are accordingly drawn at a draw ratio of 3:1 while immersed in the glycerin stretch bath. The filaments are wrapped about skewed roll 36 and wash role 38 for a residence time of about 180 seconds during which time the filaments are immersed in the water for approximately 36 seconds during which time residual quantities of glycerin are substantially removed from the same. The water present in wash bath 40 is regenerated. The washed filaments are next passed to skewed roll 42 and drying roll 44 where residual quantities of moisture are expelled from the same. Drying roll 44 is steam heated and maintained at a constant temperature of approximately 100° C.

The washed and dried filaments are next passed over a two foot heated draw shoe 46 which is provided at a constant temperature of 160° C. The residence time of the fiber while in contact with the hot shoe 46 is 1.5 seconds. The drawn fibers are passed to skewed rolls 48 and 50 and are collected on takeup roll 52 at a rate of 45 meters per minute after passing over guide roller 54. While in contact with the hot shoe 46 the filaments are drawn at a draw ratio of 3:1.

The resulting acrylonitrile homopolymer filaments having the tantalum oxide substantially uniformly dispersed within in a concentration of 16.7 percent by weight tantalum based upon the total weight of the acrylonitrile homopolymer and tantalum oxide is next unwound and continuously passed in the direction of its length for a residence time of 120 minutes through a circulating air oven maintained at 270° C. While present in the air atmosphere filaments are thermally stabilized and rendered black in appearance, capable of undergoing carbonization; and non-burning when subjected to an ordinary match flame. The resulting thermally stabilized fibrous material contains a bound oxygen content of 10 percent by weight when subjected to the Unterzaucher analysis. The original fibrous configuration is retained.

The resulting thermally stabilized fibrous material is next passed in the direction of its length through the bore of a hollow graphite susceptor present in an induction furnace provided with a circulating atmosphere of argon. The fibrous material gradually is heated to a maximum temperature of 2,100° C. and was maintained within the temperature range of 1,100° to 2,100° C. for a residence time of 60 seconds. The original fibrous configuration is retained and the thermally stabilized acrylonitrile homopolymer is carbonized and graphitized. During the heating in the argon atmosphere the tantalum oxide is converted to tantalum carbide and is substantially uniformly dispersed within the resulting carbonaceous fibrous material. The presence of the tantalum carbide can be confirmed by X-ray fluorescence spectrometry. The tantalum ions are dispersed in the fibrous product in a concentration of 30 percent by weight based upon the total weight of the fibrous material and the product has a single filament tensile strength of 160,000 psi and a single filament Young's modulus of 35,000,000 psi. The product particularly is suitable for utilization in electron shielding applications and has a denier per filament of about 1.5.

EXAMPLE II

Example I is repeated with the exception that an atmosphere of helium is substituted for the argon atmosphere. Substantially identical results are achieved.

EXAMPLE III

Example I is repeated with the exception that a nitrogen atmosphere is substituted for the argon atmosphere. Substantially identical results are achieved.

EXAMPLE IV

Example I is repeated with the exceptions indicated. Niobium pentachloride ($NbCl_5$) is substituted for tantalum pentachloride in dip bath 12. The niobium pentachloride is present in the bath in a concentration of 5 percent by weight (based on Nb) and is maintained at a constant level by addition of an 8 percent by weight make-up solution. Prior to thermal stabilization the acrylonitrile homopolymer filaments contain niobium pentoxide substantially uniformly dispersed within in a concentration of about 5 percent by weight niobium based upon the total weight of acrylonitrile homopolymer and niobium oxide. Upon heating in the argon atmosphere the niobium pentoxide is converted to niobium carbide and the niobium ions are substantially uniformly dispersed in the fibrous product in a concentration of 9 percent by weight based upon the total weight of the fibrous material.

EXAMPLE V 14.6 parts by weight acrylonitrile homopolymer and 9.1 parts by weight dicyclopentadienyl titanium dichloride (i.e. titanocene dichloride) are dissolved in 76.3 parts by weight N,N-dimethylacetamide to form a spinning solution. The low shear viscosity (Brookfield) of the resulting solution after filtration and degassing is found to be 140 poise measured at 25° C.

Figure 2:
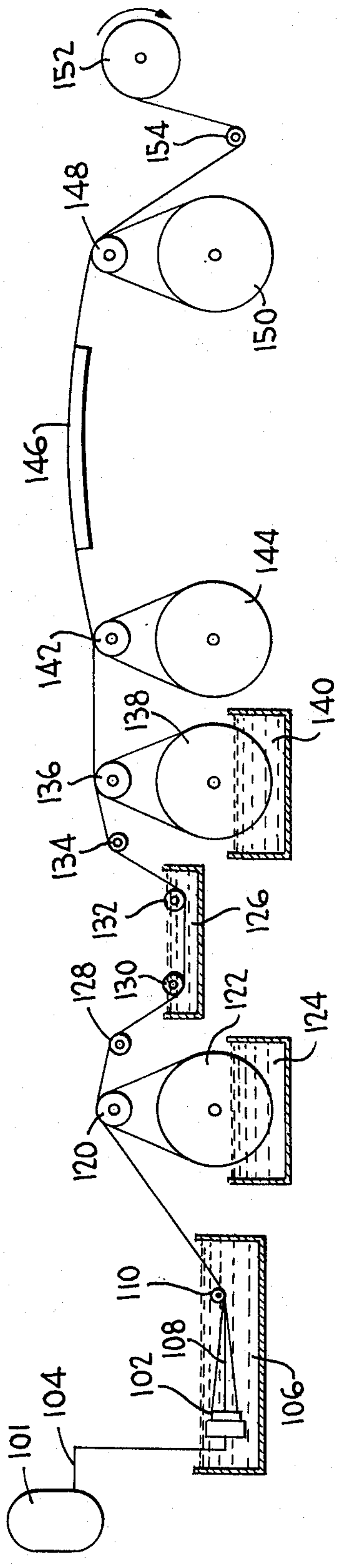

With reference to FIG. 2 the spinning solution is provided in dope bomb 101 under an atmosphere of nitrogen at 20 psig. The spinning solution is conveyed to spinneret 102 via line 104 where it is extruded into bath 106. The spinneret 102 is of the standard cup type and comprises a single circle of 80 holes each having a diameter of 100 microns. The spinning solution is conveyed to spinneret 102 at a throughput volume of about 9 cubic centimeters per minute.

The bath 106 consists of an aqueous solution of 0.5 molar sodium hydroxide and is provided at a temperature of 40° C. The bath 106 is caused to flow concurrently with coagulated filaments 108 and is maintained at a relatively constant composition by addition of sodium hydroxide. The bath 106 has a length of 35 inches and the coagulated filaments are maintained in the same for a residence time of about 12 seconds. As the extruded spinning solution containing the dicyclopentadienyl titanium dichloride contacts the bath 106 a filamentary material initially is formed which contains this compound dispersed therein, and this compound is immediately converted to titanium dioxide.

The coagulated filaments containing the tantalum dioxide substantially dispersed therein pass under roll guide 110 and are conveyed from bath 106 to skewed roll 120 and wash roll 122 which is partially immersed in water which is maintained at 25° C. The filaments are taken up on skewed roll 120 at a rate of 5 meters per minute. The filaments are wrapped about skewed roll 120 and wash roll 122 for a residence time of about 300 seconds during which time the filaments are immersed in the water for approximately 60 seconds and withdrawn with water adhering to the same. While in contact with the water residual N,N-dimethylacetamide is substantially removed.

The washed filaments are next continuously passed through stretch bath 126 having a length of 15 inches which is provided with glycerin at 90° C. Rollers 128 and 134 are situated outside the stretch bath 126 and rollers 130 and 132 immersed within the stretch bath guide the filaments during the stretching operation. The filaments are next taken up on skewed roll 136 and wash roll 138 which is partially immersed in a water wash bath 140 provided at 16° C. The filaments are taken up on skewed roll 136 at a rate of 15 meters per minute and are accordingly drawn at a draw ratio of 3:1 while immersed in the glycerin stretch bath. The filaments are wrapped about skewed roll 136 and wash roll 140 for a residence time of about 180 seconds during which time the filaments are immersed in the water for approximately 36 seconds during which residual quantities of glycerin are substantially removed from the same. The water present in wash bath 140 is circulated and is constantly regenerated. The washed filaments are next passed to skewed roll 142 and drying roll 144 where residual quantities of moisture are expelled from the same. Drying roll 144 is steam heated and maintained at a constant temperature of approximately 100° C.

The washed and dried filaments are next passed over a two foot heated draw shoe 146 which is provided at a constant temperature of 160° C. The residence time of the fiber while in contact with the hot shoe 146 is 1.5 second. The drawn fibers are passed to skewed rolls 148 and 150 and are collected on takeup roll 152 at a rate of 45 meters per minute after passing over guide roller 154. While in contact with the hot shoe 146 the filaments are drawn at a draw ratio of 3:1.

The resulting acrylonitrile homopolymer filaments having the titanium dioxide substantially uniformly dispersed within in a concentration of 6 percent by weight titanium based upon the total weight of the acrylonitrile homopolymer and titanium dioxide is next unwound and continuously passed in the direction of its length for a residence time of 150 minutes through a circulating air oven maintained at 270° C. While present in the air atmosphere the filaments are thermally stabilized and rendered black in appearance, capable of undergoing carbonization, and non-burning when subjected to an ordinary match flame. The resulting thermally stabilized fibrous material contains a bound oxygen content of 10 percent by weight when subjected to the Unterzaucher analysis. The original fibrous configuration is retained.

The resulting thermally stabilized fibrous material is next passed in the direction of its length through the bore of a hollow graphite susceptor present in an induction furnace provided with a circulating atmosphere of nitrogen. The fibrous material gradually is heated to a maximum temperature of 2,100° C. and is maintained within the temperature range of 1,100° to 2400° C. for a residence time of 60 seconds. The original fibrous configuration is retained and the thermally stabilized acrylonitrile homopolymer is carbonized. During the heating in the nitrogen atmosphere the titanium dioxide is converted to a mixture of titanium carbide and titanium nitride and is substantially uniformly dispersed within the resulting carbonaceous fibrous material. The presence of the titanium carbide and nitride can be confirmed by X-ray fluorescence spectrometry. The titanium ions are dispersed in the fibrous product in a concentration of 8.5 percent by weight based upon the total weight of the fibrous material and the product has a single filament tensile strength of 187,000 psi and a single filament Young's modulus of 27,000,000 psi. The product particularly is suitable for utilization in electron shielding applications and has a denier per filament of about 1.5.

Although the invention has been described with preferred embodiments, it is to be understood that variations and modifications may be resorted to as will be apparent to those skilled in the art. Such variations and modifications are to be considered within the purview and scope of the claims appended hereto.

We claim:

1. An improved process for the production of a metal ion containing carbonaceous fibrous material wherein a metal nitride or a metal carbide is substantially uniformly dispersed in a carbon matrix capable of utilization in electron absorbing applications comprising:

a. forming an acrylic fibrous material selected from the group consisting essentially of an acrylonitrile homopolymer and acrylonitrile copolymers containing at least about 85 mole percent acrylonitrile units and up to about 15 mole percent of one or more monovinyl units copolymerized therewith having substantially uniformly dispersed therein a halide of a transition metal selected from the group consisting essentially of cobalt, hafnium, iron, molybdenum, nickel, niobium, tantalum, titanium, tungsten, uranium, vanadium, zirconium, and mixtures of the foregoing, with transition metal being provided in said fibrous material in a concentration of about 1 to 50 percent by weight based upon the total weight of said acrylic polymer and said metal halide, b. converting said halide of said transition metal substantially uniformly dispersed within said fibrous material to an oxide of said transition metal by contact with a solution of a base or a solution of an oxidizing agent, c. heating said acrylic fibrous material having said oxide of said transition metal incorporated therein in an oxygen-containing atmosphere at a temperature of about 220° to 300° C. until said fibrous material is thermally stabilized and rendered non-burning when subjected to an ordinary match flame, and d. heating said resulting stabilized fibrous material having said oxide of said transition metal incorporated therein in an atmosphere selected from the group consisting essentially of nitrogen, argon, and helium provided at a temperature of about 1,100° to 3,000° C. for at least 15 seconds while retaining the original fibrous configuration substantially intact.

2. An improved process for the production of a metal ion containing carbonaceous fibrous material according to claim 1 wherein said acrylic fibrous material is an acrylonitrile homopolymer.

3. An improved process for the production of a metal ion containing carbonaceous fibrous material according to claim 1 wherein said acrylic fibrous material is an acrylonitrile copolymer containing at least about 95 mole percent acrylonitrile units and up to about 5 mole percent of one or more monovinyl units.

4. An improved process of the production of a metal ion containing carbonaceous fibrous material according to claim 1 wherein said halide of said transition metal is a chloride.

5. An improved process for the production of a metal ion containing carbonaceous fibrous material according to claim 4 wherein said halide is a chloride of niobium, tantalum, or titanium.

6. An improved process for the production of a metal ion containing carbonaceous fibrous material according to claim 1 wherein in step (b) said halide of said transition metal is converted to an oxide by contact with ammonium hydroxide.

7. An improved process for the production of a metal ion containing carbonaceous fibrous material according to claim 1 wherein said acrylic fibrous material having said oxide of said transition metal incorporated therein is washed prior to said thermal stabilization of step (c).

8. An improved process for the production of a metal ion containing carbonaceous fibrous material according to claim 7 wherein said acrylic fibrous material having said oxide of said transition metal incorporated therein is also drawn at a draw ratio of at least 1.5:1 prior to said thermal stabilization of step (c).

9. An improved process for the production of a metal ion containing carbonaceous fibrous material wherein a metal nitride or a metal carbide is substantially uniformly dispersed in a carbon matrix capable of utilization in electron absorbing applications comprising:

a. providing a spinning solution comprising (1) a fiber-forming acrylic polymer selected from the group consisting essentially of an acrylonitrile homopolymer and an acrylonitrile copolymer which contains at least about 85 mole percent of acrylonitrile units and up to about 15 mole percent of one or more monovinyl units copolymerized therewith, and (2) a spinning solvent selected from the group consisting essentially of N,N-dimethylformamide, N,N-dimethylacetamide, and dimethyl sulfoxide, b. extruding said solution through a shaped orifice into a coagulation bath to form an as-spun fibrous material, c. contacting said as-spun fibrous material with an impregnation solution of a halide of a transition metal selected from the group consisting essentially of cobalt, hafnium, iron, molybdenum, nickel, niobium, tantalum, titanium, tungsten, uranium, vanadium, zirconium, and mixtures of the foregoing wherein said fibrous material is substantially uniformly impregnated with said halide from said impregnation solution, and with said halide of a transition element being provided in said solution in a concentration of about 2 to 60 percent by weight based upon the total weight of the solution, d. converting said halide of said transition metal present within said fibrous material to an oxide of said transition metal by contact with a solution of a base or a solution of an oxidizing agent, e. heating said acrylic fibrous material having said oxide of said transition metal incorporated therein in an oxygen-containing atmosphere at a temperature of about 220° to 300° C. until said fibrous material is thermally stabilized and rendered non-burning when subjected to an ordinary match flame, and f. heating said resulting stabilized fibrous material having an oxide of said transition metal incorporated therein in an atmosphere selected from the group consisting essentially of nitrogen, argon, and helium provided at a temperature of about 1,100° to 3000° C. for at least 15 seconds while retaining the original fibrous configuration substantially intact.

10. An improved process for the production of a metal ion containing carbonaceous fibrous material according to claim 9 wherein said acrylic polymer is an acrylonitrile homopolymer.

11. An improved process for the production of a metal ion containing carbonaceous fibrous material according to claim 9 wherein said acrylic polymer is an acrylonitrile copolymer containing at least about 95 mole percent acrylonitrile units and up to about 5 mole percent of one or more monovinyl units.

12. An improved process for the production of a metal ion containing carbonaceous fibrous material according to claim 9 wherein said halide of said transition metal is a chloride.

13. An improved process for the production of a metal ion containing carbonaceous fibrous material according to claim 12 wherein said halide is a chloride of niobium, tantalum, or titanium.

14. An improved process for the production of a metal ion containing carbonaceous fibrous material according to claim 9 wherein said acrylic fibrous material having said oxide of said transition metal incorporated therein is washed prior to said thermal stabilization of step (e).

15. An improved process for the production of a metal ion containing carbonaceous fibrous material according to claim 14 wherein said acrylic fibrous material having said oxide of said transition metal incorporated therein is also drawn at a total draw ratio of about 3:1 to 12:1 prior to said thermal stabilization of step (e).

16. An improved process for the production of a metal ion containing carbonaceous fibrous material wherein a metal nitride or a metal carbide is substantially uniformly dispersed in a carbon matrix capable of utilization in electron absorbing applications comprising:

a. providing a spinning solution comprising (1) about 12 to 20 percent by weight based upon the total weight of the solution of a fiber-formning acrylic polymer selected from the group consisting essentially of an acrylonitrile homopolymer and an acrylonitrile copolymer which contains at least about 85 mole percent of acrylonitrile units and up to about 15 mole percent of one or more monovinyl units copolymerized therewith, (2) about 1 to 40 percent by weight based upon the total weight of the solution of a halide of a transition metal selected from the group consisting essentially of cobalt, hafnium, iron, molybdenum, nickel, niobium, tantalum, titanium, tungsten, uranium, vanadium, zirconium, or mixtures of the foregoing dissolved therein, and (3) a spinning solvent selected from the group consisting essentially of N,N-dimethylformamide, N,N-dimethylacetamide and N,N-dimethylacetamide and dimethyl sulfoxide, b. extruding said solution through a shaped orifice into a coagulation bath wherein a fibrous material is formed and said halide is converted by contact with a solution of a base or a solution of an oxidizing agent to an oxide of a transition metal which is distributed throughout said fibrous material, c. heating said acrylic fibrous material having said oxide of said transition metal incorporated therein in an oxygen-containing atmosphere at a temperature of about 220° to 300° C. until said fibrous material is thermally stabilized and rendered non-burning when subjected to an ordinary match flame, and d. heating said resulting stabilized fibrous material having an oxide of said transition metal incorporated therein in an atmosphere selected from the group consisting essentially of nitrogen, argon, and helium provided at a temperature of about 1,100° to 3,000° C. for at least 15 seconds while retaining the original fibrous configuration substantially intact.

17. An improved process for the production of a metal ion containing carbonaceous fibrous material according to claim 16 wherein said acrylic polymer is an acrylonitrile homopolymer.

18. An improved process for the production of a metal ion containing carbonaceous fibrous material according to claim 16 wherein said acrylic polymer is an acrylonitrile copolymer containing at least about 95 mole percent acrylonitrile units and up to about 5 mole percent of one or more monovinyl units.

19. An improved process for the production of a metal ion containing carbonaceous fibrous material according to claim 16 wherein said halide of said transition metal is a chloride.

20. An improved process for the production of a metal ion containing carbonaceous fibrous material according to claim 19 wherein said halide is a chloride of niobium, tantalum, or titanium.

21. An improved process for the production of a metal ion containing carbonaceous fibrous material according to claim 16 wherein in step (b) said solution is extruded into a coagulation bath comprising an aqueous solution of a base.

22. An improved process for the production of a metal ion containing carbonaceous fibrous material according to claim 16 wherein in step (b) said solution is extruded into an ammonium hydroxide coagulation bath.

23. An improved process for the production of a metal ion containing carbonaceous fibrous material according to claim 16 wherein said acrylic fibrous material having said oxide of said transition metal incorporated therein is washed prior to said thermal stabilization of step (c).

24. An improved process for the production of a metal ion containing carbonaceous fibrous material according to claim 16 wherein said acrylic fibrous material having said oxide of said transition metal incorporated therein is also drawn at a draw ratio of at least 1.5:1 prior to said thermal stabilization of step (c).

* * * * *